US011939758B2

(12) United States Patent
Wang et al.

(10) Patent No.: US 11,939,758 B2
(45) Date of Patent: Mar. 26, 2024

(54) SPRAY ROD AND INTELLIGENT TOILET

(71) Applicant: XIAMEN AXENT CORPORATION LIMITED, Xiamen (CN)

(72) Inventors: Dong Wang, Xiamen (CN); Yimin Fang, Xiamen (CN); Laicong Hong, Xiamen (CN)

(73) Assignee: XIAMEN AXENT CORPORATION LIMITED, Xiamen (CN)

( * ) Notice: Subject to any disclaimer, the term of this patent is extended or adjusted under 35 U.S.C. 154(b) by 0 days.

(21) Appl. No.: 17/799,884

(22) PCT Filed: May 31, 2021

(86) PCT No.: PCT/CN2021/097082
§ 371 (c)(1),
(2) Date: Aug. 15, 2022

(87) PCT Pub. No.: WO2021/244461
PCT Pub. Date: Dec. 9, 2021

(65) Prior Publication Data

US 2023/0092809 A1 Mar. 23, 2023

(30) Foreign Application Priority Data

Jun. 1, 2020 (CN) ......................... 202010484501.7

(51) Int. Cl.
*E03D 9/08* (2006.01)
*A47K 7/08* (2006.01)
*A61H 35/00* (2006.01)

(52) U.S. Cl.
CPC .................. *E03D 9/08* (2013.01); *A47K 7/08* (2013.01); *A61H 35/00* (2013.01)

(58) Field of Classification Search
CPC .. E03D 9/08; A47K 7/08; A61H 35/00; A61H 2201/1666; A61H 33/0087; A61H 33/6068
(Continued)

(56) References Cited

U.S. PATENT DOCUMENTS

2017/0087569 A1 3/2017 Nagata
2021/0023580 A1 1/2021 Lim

FOREIGN PATENT DOCUMENTS

CN 1304473 A 7/2001
CN 107034963 A 8/2017
(Continued)

OTHER PUBLICATIONS

International Search Report and Written Opinion for PCT/CN2021/097082, dated Aug. 30, 2021; 12 pages including English Translation.

*Primary Examiner* — Lori L Baker
(74) *Attorney, Agent, or Firm* — Schwabe, Williamson & Wyatt, PC

(57) ABSTRACT

A spray rod and an intelligent toilet are provided. The spray rod comprises: a body, a body water passage being formed in the body; a nozzle assembly, arranged separately from the body, the nozzle assembly having a nozzle communicated with the body water passage; a vibration motor, provided in the nozzle assembly, so that the vibration motor drives the nozzle assembly to vibrate when the vibration motor operates, and washing water sprayed from the nozzle at least swings in the transverse direction. The spray rod generates pulsating water in the transverse direction by using vibration, provides a novel flushing water splash, and improves the flushing effect.

15 Claims, 3 Drawing Sheets

(58) Field of Classification Search
USPC .................................. 4/420.4, 420, 447–448
See application file for complete search history.

(56) References Cited

FOREIGN PATENT DOCUMENTS

| | | | |
|---|---|---|---|
| CN | 108024669 | A | 5/2018 |
| CN | 110730847 | A | 1/2020 |
| CN | 212835740 | U | 3/2021 |
| JP | 2001081833 | A | 3/2001 |
| JP | 2001227038 | A | 8/2001 |
| JP | 2002275995 | A | 9/2002 |

SPRAY ROD AND INTELLIGENT TOILET

CROSS-REFERENCE TO RELATED APPLICATION

The present application is a national phase entry under 35 U.S.C. § 371 of International Application No. PCT/US2021/097082, filed May 31, 2021 which designates the United States of America, which claims priority to CN Application No. 202010484501.7, filed Jun. 1, 2020, the entire disclosures of each of these applications are hereby incorporated by reference in their entireties and for all purposes.

FIELD

The present disclosure relates to the technical field of intelligent toilets, and in particular to a spray rod.

BACKGROUND

A flushing function is the basic function of an intelligent toilet. At present, the flushing technology applied to the intelligent toilet has a limited power under an electric control platform of a whole machine. A flow volume generally does not exceed 650 ML as the water temperature should meet the set standard requirements. Under this condition, most of the existing methods directly adopt the method of adding an air pump for air mixing in order to improve the flushing effect. However, the water spray in this way is messy, and the flushing experience is not comfortable.

In addition, in patents of CN102146697B and CN103967098, the use of a pulse pump is proposed to improve the flushing effect. For one point of the washing surface, the method changes a continuous water flow into intermittent water droplets and generates pulses in a longitudinal direction. This method can improve the flushing effect to a certain extent, but the washing effect to a narrow ditch dirt is poor.

Therefore, how to enrich the flushing water spray of the existing intelligent toilet and improve the flushing effect is a problem to be solved by those skilled in the art.

SUMMARY

A novel spray rod is provided according to the present disclosure, which overcomes the shortcomings of the conventional technology described in the background technology.

A spray rod according to the present disclosure includes:

a body; where a body flowing passage is formed in the body;

a nozzle assembly, arranged separately from the body, in which the nozzle assembly includes a nozzle in communication with the body flowing passage; and a vibration motor arranged in the nozzle assembly to drive the nozzle assembly to vibrate when the vibration motor operates, in which a washing water sprayed by the nozzle oscillates at least in a transverse direction.

Preferably, a cross-sectional area of a water outlet hole of the nozzle ranges from 0.5 mm$^2$ to 1.8 mm$^2$.

Preferably, a vibration frequency of the vibration motor ranges from 80 Hz/s to 300 Hz/s.

Preferably, a front end of the body includes an empty chamber extending through from top to bottom, and the nozzle assembly is arranged in the empty chamber and vibrates in the empty chamber under the action of the vibration motor.

Preferably, the nozzle assembly is connected to the body through a flexible connecting member, which is made of an elastic material so as to reduce the vibration transmitted to the body when the vibration motor operates.

Preferably, the flexible connecting member is a hose which connects the body flowing passage with the nozzle.

Preferably, the flexible connecting member is a buffer sleeve which is wrapped on an outer circumference of the nozzle assembly, and the buffer sleeve is fixed on the body.

Preferably, the body includes a connecting bracket which is fixed to the body, the body flowing passage is in communication with the nozzle through the connecting bracket, and the connecting bracket is connected with the nozzle assembly through the flexible connecting member.

Preferably, a flowing passage is formed inside the flexible connecting member, and the flowing passage is in communication with the nozzle.

Preferably, the nozzle assembly includes an accommodating chamber for accommodating the vibration motor, and the accommodating chamber is integrally formed with the flexible connecting member.

An intelligent toilet is provided according to the present disclosure, which includes the above spray rod.

Compare with the conventional technology, the technical solutions of the present disclosure have the following advantages:

1. a pulse water flow in the transverse direction is generated by the vibration, which provides a new type of flushing water spray and improves the flushing effect;
2. the water outlet hole is reduced properly in addition to the transverse pulse water, and the spray water flow rate can increase, so as to improve the washing effect of stubborn dirt;
3. the vibration frequency preferably ranges from 80 Hz/s to 300 Hz/s, which can minimize the volume of the vibration motor as much as possible providing the amplitude meets the requirements;
4. the unnecessary contact between the nozzle assembly and the body during the vibration process is avoided and the vibration transmission is reduced by arranging the nozzle assembly in the empty chamber; and
5. the nozzle assembly is connected with the body by the flexible connector made of the elastic material, which can reduce the vibration transmitted to the body when the vibration motor operates and reduce the noise.

DETAILED DESCRIPTION OF THE EMBODIMENTS

The present application is described in further detail hereinafter with reference to the drawings and specific embodiments.

Figure 1:
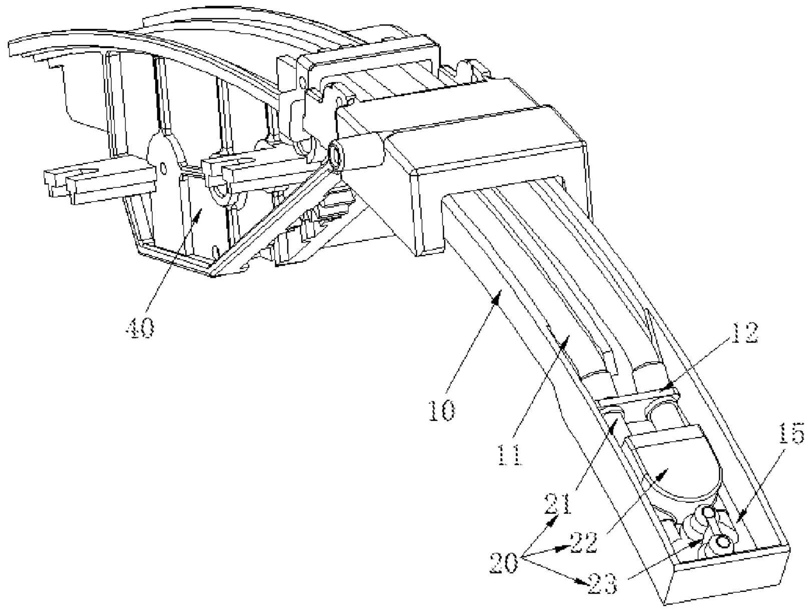
FIG. 1 is a schematic view showing an overall structure of a spray rod according to an embodiment of the present disclosure.
Figure 2:
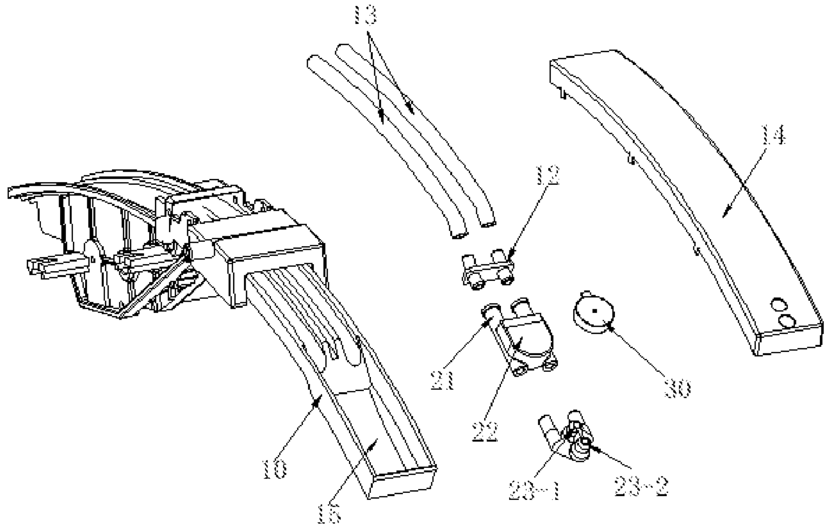
FIG. 2 is a schematic partial exploded view of the spray rod according to the embodiment of the present disclosure.

As shown in FIG. 1 and FIG. 2, a spray rod according to the present disclosure includes a body 10, a nozzle assembly 20, a vibration motor 30 and a spray rod bracket 40 for receiving the body 10 and driving the body 10 to move back and forth. The nozzle assembly 20 is arranged separately from the body 10. A body flowing passage 11 is formed in the body 10. The nozzle assembly 20 includes a nozzle 23 (including a hip washing nozzle 23-2 and a feminine washing nozzle 23-1), and the nozzle 23 is in communication with the body flowing passage 11. The vibration motor 30 is arranged in the nozzle assembly 20 to drive the nozzle assembly 20 to vibrate when the vibration motor 30 operates, and washing water sprayed by the nozzle 23 oscillates at least in a transverse direction. In this embodiment, a front end of the body 10 includes an empty chamber 15 extending through from top to bottom, and the nozzle assembly 20 is arranged in the empty chamber 15 and is connected with the body 10 through a flexible connecting member 21, and the nozzle assembly 20 vibrates inside the empty chamber 15 under the action of the vibration motor 30. The flexible connecting member 21 is made of an elastic material, so as to reduce the vibration transmitted to the body 10 when the vibration motor 30 operates. Since the vibration motor 30 is arranged inside the nozzle assembly 20 and is independent of the spray rod body 10, the transmission of vibration to the spray rod body 10 can be reduced and the noise can be reduced.

In this embodiment, a flowing passage is formed in the flexible connecting member 21, and the water flow passage is in communication with the nozzle 23. The body 10 is provided with a connecting bracket 12 fixed to the body 10, and the body flowing passage 11 is in communication with the flowing passage through the connecting bracket 12. The nozzle assembly 20 further includes an accommodating chamber 22 for accommodating the vibrating motor 30. The accommodating chamber 22 is integrally formed with the flexible connecting member 21, that is, the accommodating cavity 22 is also made of an elastic material.

The body flowing passage 11 can be formed by connecting an external water passage with a hose 13, or can be directly formed as a water passage inside the body. In this embodiment, the body 10 is provided with a. groove for placing the hoses 13, the connecting bracket 12 is provided with a front connecting port 12-1 and a rear connecting port 12-2, the front connecting port 12-1 is connected with the flowing passage of the nozzle assembly 20, and the rear connecting port 12-2 is connected with the hose 13. Thus, the nozzle 23 is in communication with the body flowing passage 11 through the connecting bracket 12. The way in which the connecting bracket 12 is fixed to the body 10 may be a conventional connection means and is not limited herein. In addition, the body 10 is covered by a housing 14 outside, and the body 10 is integrally assembled on the spray rod bracket 40, which can realize the functions of reciprocating and flushing.

In this way, the nozzle assembly 20 is integrally connected with the connecting bracket 12 through the flexible connecting member 21, and the flexible connecting member 21 further functions to support the whole nozzle assembly 20. During flushing, the washing water flows to the nozzle assembly 20 after passing through the hose 13 to the connecting bracket 12, and the vibration motor is turned on, and the vibration is then transmitted to the hip washing nozzle 23-2 or the feminine washing nozzle 23-1 through the accommodating chamber 22 to generate a transverse amplitude, so as to drive the water to oscillate to form a sine wave-like water spray.

A water outlet hole of the nozzle 23 according to the present disclosure can be appropriately reduced. A preferred cross-sectional area of the water outlet hole ranges from 0.5 $mm^2$ to 1.8 $mm^2$. If the water outlet hole becomes smaller, an internal pressure can increase and a spray water flow rate can increase, so as to improve the washing effect of stubborn dirt. However, the overall washing flow will be too small if the water outlet hole is excessively small, which can affect the washing efficiency. On the contrary, if the water outlet hole is excessively large, the spray water flow rate will be reduced, the flushing force will be reduced, and the overall washing flow will be too large which can affect the heating power and EMC test to the intelligent toilet. The cross-sectional area of the water outlet hole referred to herein can be a cross-sectional area of a single hole or the sum of the cross-sectional areas of multiple holes. The shape of the water outlet hole is not limited herein, which can be circular or other shapes.

For the selection of a vibration frequency of the vibration motor 30 in this disclosure, under a certain amplitude, the higher the frequency is, the stronger the stimulation is. However, the higher the frequency is, the greater the energy to be provided by the vibration motor is, and the larger the volume of the vibration motor is. Therefore, the vibration frequency of the vibration motor in this disclosure preferably ranges from 80 Hz/s to 300 Hz/s, and a mass of the nozzle assembly is as small as possible, so as to reduce the amplitude required to be provided by the vibration motor.

Figure 3:
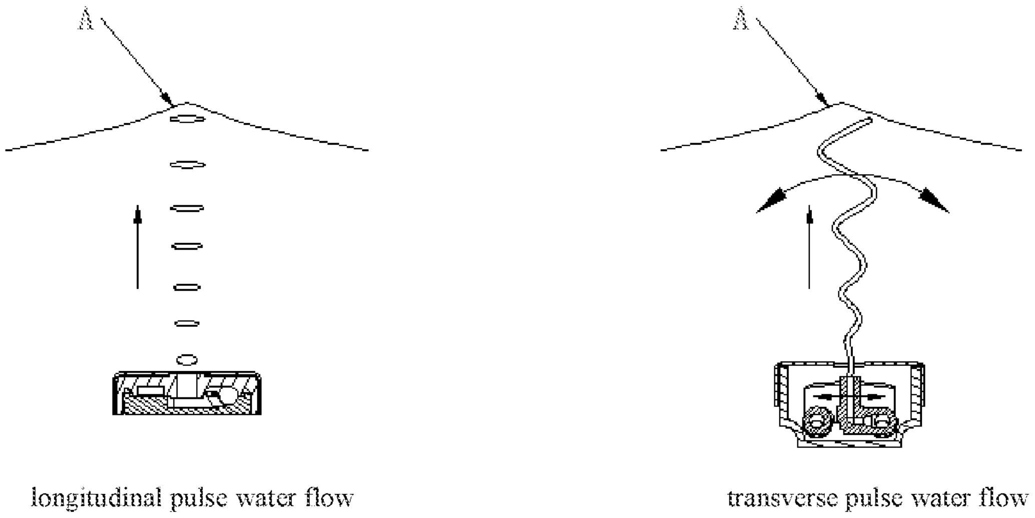
FIG. 3 is a schematic view showing comparison of water spray shapes of the spray rod according to the embodiment of the present disclosure.

FIG. 3 shows specific water spray shapes of a longitudinal pulse water flow in the conventional technology and a transverse pulse water flow in the present disclosure. The nozzle assembly according to the present disclosure oscillates after vibration, and the spray water can become a sine wave-like water spray. When the water spray oscillates rapidly, the actual washing area is then increased, so as to solve the problem of low washing efficiency. For a point A taken in the washing zone, during flushing, the water volume over time at the point A in the two schemes can be formed into a regular intermittent form, that is, a pulse water.

Figure 4:
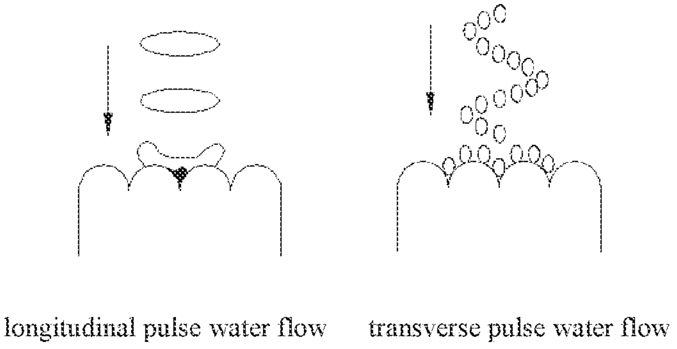
FIG. 4 is a schematic view showing comparison of washing effects of the spray rod according to the embodiment of the present disclosure.

FIG. 4 shows washing effects of the longitudinal pulse water flow in the conventional technology and the transverse pulse water flow according to the present disclosure. When the longitudinal pulse water flow reaches a narrow ditch, the water spray is intermittent large particle water, most of which is blocked by protruding portions around the narrow ditch, and thus energy is lost, which affects the washing of the bottom of the narrow ditch. However, when the transverse pulse water flow according to the present disclosure reaches the narrow ditch, it becomes small particle water, which can reach deeper into the bottom of the narrow ditch and clean more thoroughly.

Figure 5:
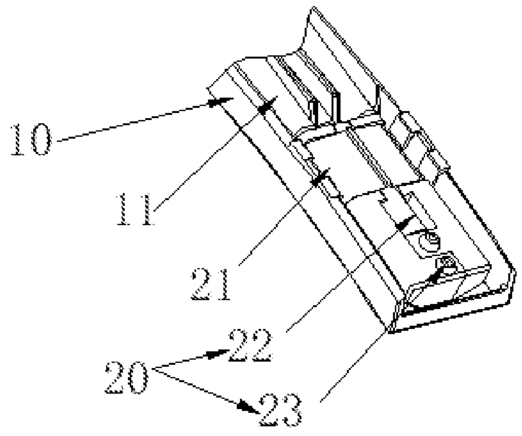
FIG. 5 is a schematic view showing an overall structure of the spray rod according to another embodiment of the present disclosure.
Figure 6:
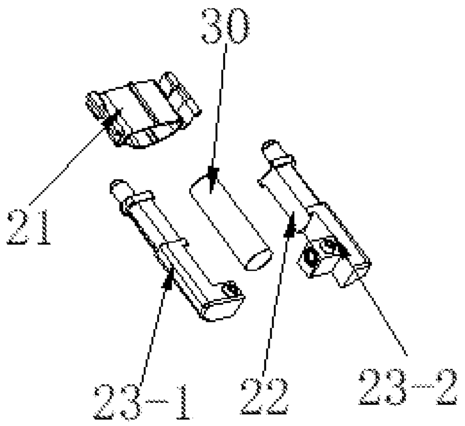
FIG. 6 is a schematic exploded view of a nozzle assembly of the spray rod according to another embodiment of the present disclosure.

FIG. 5 and FIG. 6 show another embodiment of the present disclosure, In this embodiment, the flexible connecting member 21 is a buffer sleeve, which is wrapped over an outer circumference of the nozzle assembly 20, and the buffer sleeve is fixed on the body 10. The hip washing nozzle 23-2 and the feminine washing nozzle 23-1 can be assembled together and an accommodating chamber 22 for accommodating the vibrating motor 30 is formed between the hip washing nozzle 23-2 and the feminine washing nozzle 23-1. In this way, the whole nozzle assembly 20 is connected with the body by the flexible connecting member 21. Since the flexible connecting member 21 is made of an elastic material, the vibration transmitted to the body during the operation of the vibration motor can be reduced and the noise can be reduced.

Similarly, the flexible connecting member may be a hose which connects the body flowing passage with the nozzle, and the whole nozzle assembly is supported by the hose. The flexible connecting member can be replaced by other elastic bodies, such as spring and elastic plastic wall in order to support the whole nozzle assembly. Meanwhile, the vibration of the nozzle assembly cannot be significantly influenced, and cannot be transmitted to the body, which causes the noise increasing.

The preferred embodiments of the present application are shown and described above. It should be understood that the present application is not limited to the form disclosed herein, and should not be regarded as an exclusion of other embodiments, but may be used in various other combinations, modifications and environments, and may be modified through the above teachings or technology or knowledge in related fields within the scope of the present application concept herein. However, the modifications and changes made by those skilled in the art do not deviate from the spirit and scope of the present application, and shall be within the protection scope of the claims attached to the present application.

The invention claimed is:

1. A spray rod, comprising:

a body, wherein a body flowing passage is formed in the body;

a nozzle assembly arranged separately from the body, wherein the nozzle assembly comprises a nozzle in communication with the body flowing passage; and a vibration motor arranged in the nozzle assembly to drive the nozzle assembly to vibrate when the vibration motor operates, wherein a washing water sprayed by the nozzle oscillates at least in a transverse direction; wherein the nozzle assembly comprises an accommodating chamber for accommodating the vibration motor.

2. The spray rod according to claim 1, wherein the nozzle assembly is connected to the body through a flexible connecting member, the flexible connecting member is made of an elastic material so as to reduce the vibration transmitted to the body when the vibration motor operates.

3. The spray rod according to claim 2, wherein the flexible connecting member is a hose which connects the body flowing passage with the nozzle.

4. The spray rod according to claim 2, wherein the flexible connecting member is a buffer sleeve, which is wrapped on an outer circumference of the nozzle assembly, and the buffer sleeve is fixed on the body.

5. The spray rod according to claim 4, wherein the nozzle comprises a hip washing nozzle and a feminine washing nozzle, the hip washing nozzle and the feminine washing nozzle are transversely assembled together, and the accommodating chamber for accommodating the vibration motor is formed between the hip washing nozzle and the feminine washing nozzle.

6. The spray rod according to claim 2, wherein the body comprises a connecting bracket, which is fixed to the body, and wherein the body flowing passage is in communication with the nozzle through the connecting bracket, and the connecting bracket is connected with the nozzle assembly through the flexible connecting member.

7. The spray rod according to claim 6, wherein a flowing passage is formed inside the flexible connecting member, and the flowing passage is in communication with the nozzle.

8. The spray rod according to claim 7, wherein the number of the flowing passage is two, and the number of the body flowing passage is two, which are corresponding to the body flowing passages, respectively.

9. The spray rod according to claim 7, wherein the connecting bracket is provided with a front connecting port and a rear connecting port, whiner the front connecting port is connected with the flowing passages of the nozzle assembly, and the rear connecting port is connected with the body flowing passages.

10. The spray rod according to claim 2, wherein the accommodating chamber is integrally formed with the flexible connecting member.

11. The spray rod according to claim 1, wherein a cross-sectional area of a water outlet hole of the nozzle ranges from 0.5 $mm^2$ to 1.8 $mm^2$.

12. The spray rod according to claim 1, wherein a vibration frequency of the vibration motor ranges from 80 Hz/s to 300 Hz/s.

13. The spray rod according to claim 1, wherein a front end of the body comprises an empty chamber extending through from top to bottom, and the nozzle assembly is arranged in the empty chamber and vibrates in the empty chamber under the action of the vibration motor.

14. The spray rod according to claim 1, further comprising a spray rod bracket for receiving the body and driving the body to move back and forth.

15. An intelligent toilet, comprising the spray rod according to claim 1.

* * * * *